United States Patent [19]
Rossi

[11] Patent Number: 5,640,689
[45] Date of Patent: Jun. 17, 1997

[54] COMMUNICATIONS APPARATUS WITH ANTENNA SWITCHING BASED ON ANTENNA ROTATION

[75] Inventor: Markku J. Rossi, Houston, Tex.

[73] Assignee: Compaq Computer Corp., Houston, Tex.

[21] Appl. No.: 414,759

[22] Filed: Mar. 31, 1995

[51] Int. Cl.$^6$ .................................................. H04B 1/38
[52] U.S. Cl. ........................ 455/89; 455/90; 455/129; 455/351
[58] Field of Search ................. 455/33.1, 89, 90, 455/347, 351, 129, 280; 379/58, 59, 61; 343/702

[56] References Cited

U.S. PATENT DOCUMENTS

| | | | |
|---|---|---|---|
| 3,969,728 | 7/1976 | Hodsdon et al. | 343/702 |
| 4,286,335 | 8/1981 | Eichler et al. | 455/89 |
| 4,958,382 | 9/1990 | Imanishi | 455/277 |
| 5,121,504 | 6/1992 | Toko | 455/90 |
| 5,138,329 | 8/1992 | Saarnimo et al. | 343/702 |
| 5,255,001 | 10/1993 | Tamura et al. | 343/702 |
| 5,278,570 | 1/1994 | Jaramillo et al. | 343/702 |
| 5,300,938 | 4/1994 | Maroun et al. | 343/702 |
| 5,337,061 | 8/1994 | Pye et al. | 343/702 |
| 5,353,036 | 10/1994 | Baldry | 343/702 |
| 5,361,061 | 11/1994 | Mays et al. | 340/825 |
| 5,369,803 | 11/1994 | Hirasawa et al. | 455/89 |
| 5,373,300 | 12/1994 | Jenness et al. | 343/102 |
| 5,440,315 | 8/1995 | Wright et al. | 343/702 |
| 5,479,178 | 12/1995 | Ha | 343/702 |

OTHER PUBLICATIONS

Popular Electronics, Personal Digital Assitants, Mar. 1994, pp. 51–62, 92, 93.

*Primary Examiner*—Reinhard J. Eisenzopf
*Assistant Examiner*—Philip J. Sobutka
*Attorney, Agent, or Firm*—Jenkens & Gilchrist, P.C.

[57] ABSTRACT

An electronic device includes a host component having a first antenna; and a radio unit that may be connected to the host component and that has a second, rotatable antenna. The radio unit also includes a switch that is triggered by rotation of the second antenna to activate either the first antenna or the second antenna.

10 Claims, 2 Drawing Sheets

5,640,689

COMMUNICATIONS APPARATUS WITH ANTENNA SWITCHING BASED ON ANTENNA ROTATION

BACKGROUND OF THE INVENTION

1. Field of the Invention

The present invention relates generally to the field of antennas, and more particularly to antenna systems for portable electronic devices.

2. Description of Related Art

An important attribute of portable electronic devices such as personal digital assistants ("PDA's") is ability to communicate with other electronic devices or systems. By such means PDA's can receive information from other systems, which can relieve a PDA user from a requirement to enter information in unit by unit using the conventional PDA screen input. Furthermore, by such means PDA's can send or relay collected and stored information to other systems, which can serve to make the PDA's "connected" branches of larger systems.

A number of different communication technologies have heretofore been incorporated into PDA's. One such technology is infrared beam technology. Via infrared beams, information can be passed between properly equipped, and closely situated, PDA's and computers. A second communication technology heretofore incorporated into PDA's is that used by conventional modems. PDA's have been made so as to include or incorporate modems and standard telephone line connection ports. Using the modems and ports, properly equipped PDA's have been able to send facsimile messages. A third communication technology that has been incorporated into PDA's is paging technology. PDA's, such as Apple's Newton MessagePad 110 and Motorola's Envoy, have been made capable of receiving wireless paging messages through an add-on accessory or by an internal transceiver.

Despite all of the advances made in communication capabilities of devices such as PDA's, it remains important and desirable to add new communication capabilities to such devices, and to further enhance the existent capabilities.

A communication network that has become firmly established in the United States and in various countries abroad over the past several years is the cellular communications network. The cellular communications network is a mobile telephone service that has a multitude of service areas (called "cells") that reuse transmission frequencies to increase the number of possible subscribers. Typically, each cell uses a different set of frequencies from those cells adjacent to it to prevent interference. Most commonly, service areas are divided into hexagonal cell sites that fit together to define a honeycomb. Each cell contains a transceiver that is connected to a central switch or mobile telephone exchange ("MTX") via a radio link. Each cell also contains a controller that controls the transfer of calls from one cell to another under the direction of the MTX. The MTX, in turn, is connected to the conventional telephone network so that calls from and to subscribers can travel at least partially over that network.

The cellular system offers communication capabilities that have not yet been fully exploited by portable electronic devices such as PDA's. It is, therefore, a shortcoming and deficiency of the prior art that there has not yet been developed a device especially well suited to combine the capabilities of PDA's and cellular telephones.

SUMMARY OF THE INVENTION

The present invention overcomes the shortcoming and deficiency of the prior art mentioned above by providing a switchable antenna system including a host component having a first antenna; and a radio unit that may be connected to the host component and that has a second, rotatable antenna. According to the teachings of the present invention, the radio unit also includes a mechanical switch that is triggered by rotation of the second antenna to activate the first antenna or the second antenna.

In an embodiment of the present invention the host component is a PDA with an antenna and a cradle and the radio unit is a cellular telephone that can be placed into the cradle. In this embodiment, the mechanical switch triggers activation of either the PDA's antenna or the cellular telephone's antenna depending upon the rotational position of the cellular telephone's antenna.

In another aspect, the present invention provides a radio unit including a radio frequency portion, a first antenna rotatably connected to the radio unit, a port operatively connected to a second antenna, and a switch operative to connect the radio frequency portion to either the first antenna or the port.

Accordingly, an object of the present invention is to provide a simple, low cost antenna switching system.

Another object of the present invention is to provide an antenna switching system especially well suited to be incorporated into a combination PDA and cellular telephone unit.

BRIEF DESCRIPTION OF THE DRAWINGS

Further objects, advantages, and novel features of the present invention can best be understood from the following detailed description of the invention taken in conjunction with the accompanying drawings in which.

DETAILED DESCRIPTION OF THE INVENTION

Figure 1:
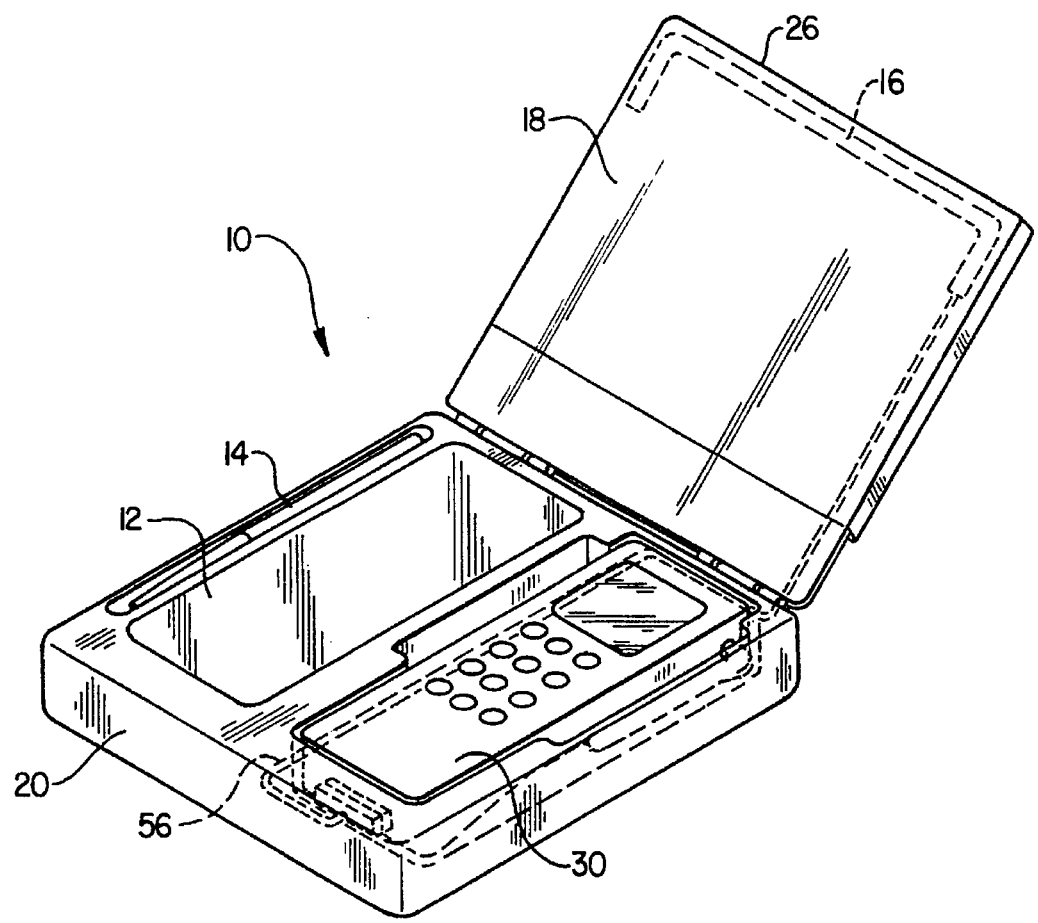
FIG. 1 is an isometric view of a combination PDA and cellular telephone device including an antenna switching system according to the teachings of the present invention.

Referring now to the drawings wherein like or similar elements are designated with identical reference numerals throughout the several views, and wherein the various elements shown are not necessarily drawn to scale, and more particularly to FIG. 1, there is shown an electronic device (generally designated by reference number 10) constructed according to the teachings of the present invention.

Device 10 is, in part, a personal digital assistant ("PDA") having a conventional LCD input screen 12 and stylus 14. Via various software-prescribed input and output formats, and via input letters and touches made by the stylus, the PDA can receive, manipulate and output data such as names, addresses, telephone numbers, scheduled events, account information, and the like. The PDA depicted in FIG. 1, like virtually all PDA's, includes a generally horizontally disposed printed circuit board (not shown) disposed within the housing beneath the screen 12.

To facilitate receiving and sending information, the PDA unit 10 may also include a number of communication capabilities. It may have, for example, built-in facsimile, pager, and electronic mail capabilities. To accommodate inclusion of these capabilities, PDA unit 10 has two-way wire and wireless interfaces. The wire interface is in the form of a conventional telephone line connection port (not shown), via which facsimile and electronic mail messages can be sent and received. The wireless interface, by which, for example, pages may be received, is formed in part by an antenna 16.

Antenna 16 is depicted as being internal to a lid 18 that is rotatably connected to a unit housing 20. The PDA unit 10 has a housing 20 to contain and protect the internal circuitry (e.g., the printed circuit board mentioned above) of the PDA unit 10. The PDA unit 10 has a lid 18 primarily to protect the PDA screen 12 when the PDA is not in use. The particular lid 18 depicted in FIG. 1 is shown to be rotatably connected to the housing 20, so that it can be rotated down flat across the screen 12 (into what can be considered to be a "fully closed" positioned) to protect the screen 12, and so that it can also be rotated up and around through a first position (a "partially opened" position; depicted in FIG. 1) to a position where the lid 18 comes to rest flat against the bottom of the housing 20 (into what can be considered to be a "fully opened" position; depicted in FIG. 4). To make it possible for the lid 18 to bend all the way around to the fully opened position, the lid 18 includes a flexible band 22 (best seen in FIGS. 2 and 3) that bends easily around the back side portion 24 of the housing 20.

Figure 2:
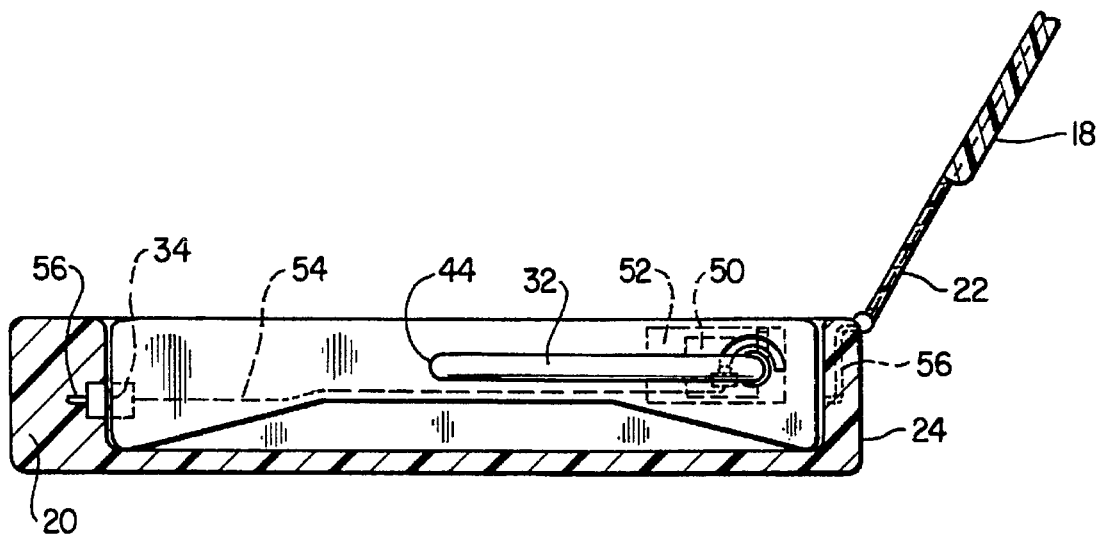
FIG. 2 is a cross sectional view of the device depicted in FIG. 1, wherein the PDA lid is partially opened and the telephone antenna is rotated into a stored, inactive position.
Figure 3:
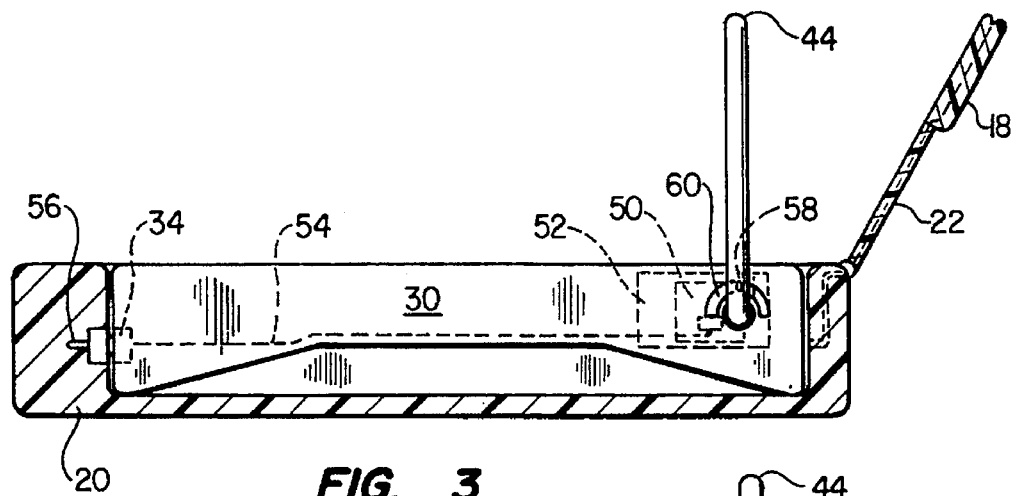
FIG. 3 is another cross sectional view of the device depicted in FIG. 1, wherein the PDA lid is partially opened and the telephone antenna has been rotated into a first, active position.

Inside the lid 18 that covers the screen 12 of the PDA is a good location for a flat antenna unit, such as antenna 16, because when the lid 18 is in the partially opened position, such as that depicted in FIGS. 1-3, the upper edge 26 of the lid 18 is far away from the printed circuit board horizontally disposed within the housing 20. When the PDA unit 10 is using the antenna 16, it is useful for the antenna 16 to be as far away from that board as possible. One reason for this is because the printed circuit board can induce interference in the antenna if the antenna is nearby when it—the printed circuit board—is producing electromagnetic radiation. That is, radiation or electromagnetic interference (EMI) coupling can arise. The farther away the antenna 16 is from housing 20, the less likely coupling will arise and degrade system performance.

An advantage of a flat antenna unit to other types of antennas is relative low cost. The fact that such units are low priced, coupled with the fact that there is ample room within the lid 18 for such units, could allow for inclusion of two antenna pieces 16 within the lid 18. In a case in which two antenna pieces were used, it could be useful to have one piece provide more signal than the other, and that piece could be connected to a receiver (as opposed to a transmitter) module. By such means overall system performance could be enhanced.

While it is useful to have a lid 18 that is permanently connected to the housing 20 (as opposed, for example, to a lid that can be slid on and completely off of the housing 20), to prevent the lid from being misplaced, a permanently connected lid can cause problems. One problem arises because many users do not like to operate a PDA with a connected lid in a partially opened position (such as that depicted in FIG. 1). Instead, those users prefer to rotate the lid 18 into the fully opened position where it lies flat against the bottom of the housing 20 of the PDA unit 10. In that position, those users generally feel that the lid is out of the way and thus incapable of interfering with their use of the PDA (e.g., holding the PDA and writing on the screen 12). A problem with this is that the antenna in the lid is thereby brought very close to the printed circuit board within the PDA. In this position the antenna is virtually unusable because of coupling effects.

Figure 5:
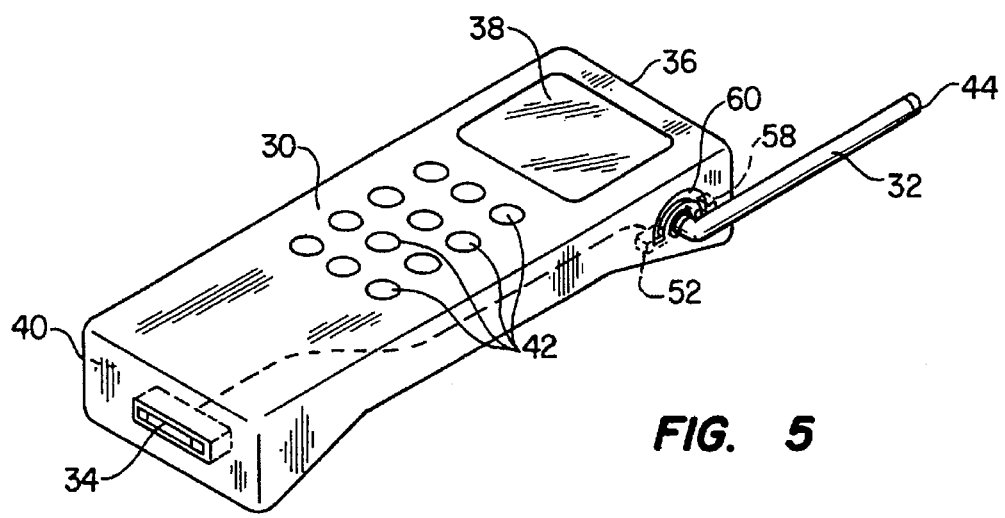
FIG. 5 is an isometric view of the cellular telephone depicted in FIG. 1, wherein the telephone has been removed completely from the PDA and wherein its antenna has been rotated into a second, active position.

A unique aspect of the PDA 10 depicted in FIG. 1 is the fact that its housing forms a opening (a "cradle") that can hold a radio unit, such as a cellular telephone 30. The cellular telephone 30 may be inserted into the opening of the PDA and used as described hereinbelow, and it may also be operated as an independent unit. The cellular telephone 30 is shown in FIG. 5 in a detached, independent state. In that FIG. it can be clearly seen that the telephone 30 includes a rotatable antenna 32 and a bottom connector 34. These two components interface and interact with the PDA unit 10 in important ways, discussed in detail below.

Continuing to refer to FIG. 5 it may be seen that the antenna 32 of the cellular telephone 30 is connected to the telephone 30 near its top 36. The top 36 of the telephone 30 is adjacent the telephone ear speaker 38. Immediately below the speaker 38 toward the bottom 40 of the telephone 30 is a keypad 42. Between the keypad 42 and the bottom 40 of the telephone 30 is a conventional mouthpiece (not shown). Again, at the bottom 40 of the telephone 30 is the connector 34, certain purposes of which are discussed below.

Comparing FIG. 5 and FIG. 2, it may be seen that the antenna 32 can rotate 180 degrees from a first position with its tip 44 pointing towards the bottom 40 of the telephone 30 (depicted in FIG. 2) to a second position with its tip 44 pointing away from the bottom 40 of the telephone 30 (depicted in FIG. 5).

Referring now solely to FIG. 2, there is shown a cross sectional view of the PDA unit 10 of FIG. 1 including a mounted telephone 30. In FIG. 2, the rotatable antenna 32 of the telephone 30 may be seen in its first position, described above. An aspect of the present invention is that within the telephone 30 is a mechanical switch 50. This mechanical switch 50 has two positions, and it is capable of directing an RF signal to or from either of two possible destinations when viewed from a conventional RF module 52 within the telephone 30.

In the configuration depicted in FIG. 2, the mechanical switch 50 is in a first position. In this position, the RF signal to and from the RF module 52 is connected by the switch 50 to a line 54 within the telephone 30 connected to the bottom connector 34. The bottom connector 34 is, in turn, connected to a line 56 within the PDA housing 20 (best seen in FIG. 1) that carries the RF signal to and from the antenna 16 disposed in the PDA lid 18. Furthermore, in this configuration the mechanical switch 50 does not couple the RF module 52 and the rotatable antenna 32. Thus, while the antenna 16 is in use, the antenna 32 is disabled. In this situation, use of the antenna 16 rather than use of the antenna 32 is preferred because the lid 18 is in the partially opened position, far from the printed circuit board within the PDA unit 10, and the antenna 16 is therefore less likely to suffer from interference than is the antenna 32, disposed very close to the printed circuit board. This would be an ideal result if, for example the PDA unit 10 and telephone 30 were mounted in a car. The telephone 30 could be placed in the PDA opening, or "cradle," but in use the telephone would use the antenna 16 in the lid 18.

Referring now to FIG. 3, it may be seen that it is possible to rotate the antenna 32 of the telephone 30 when the telephone 30 is in the PDA cradle. In FIG. 3, the antenna has been rotated halfway (i.e., 90 degrees) through its complete angle of rotation (i.e., 180 degrees).

When so rotated, the mechanical switch 50 can be triggered to switch to its second position. In this position, the RF signals to and from the module 52 are directed to and from the antenna 32 rather than to and from the antenna 16 via lines 54 and 56. One way of accomplishing this switch could be by having a contact element 58 projecting from the antenna 32, which element 58 rides in a groove 60 where it may make contact with a contact strip (which could be biased by springs or the like to ensure good contact is made) of the switch 50 when it has been rotated 90 degrees (as shown in FIGS. 3 and 4) or more (as shown in FIG. 5).

Figure 4:
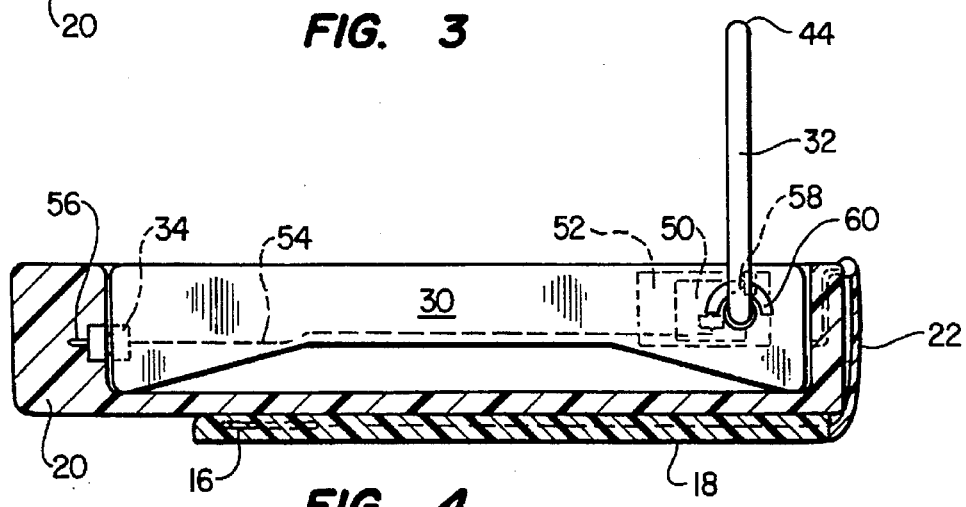
FIG. 4 is yet another cross sectional view of the device depicted in FIG. 1, wherein the PDA lid is fully opened and the telephone antenna has been rotated into a first, active position.

In the configurations of FIGS. 3 and 4, therefore, the antenna 32 is activated and used by the telephone 30 and the antenna 16 is not used by it. An advantage of using the antenna 32 in this situation rather than the antenna 16 is that the antenna in use will be far from printed circuit boards within the unit 10, even if the lid 18 is rotated back against the bottom of the unit 10, as many users are apt to do.

Referring again to FIG. 5, the telephone 30 is shown removed from the cradle in unit 10 and with its antenna 32 rotated so that the antenna tip points away from the bottom 40 of the telephone 30. In this configuration, because the switch 50 has a contact strip, any position of the antenna 32 past the "90 degree mark" (depicted in FIGS. 3 and 4) from a "zero degree mark" (depicted in FIG. 2) will cause the antenna 32 to be operatively connected to the RF module 52.

Connector 34 may also serve functions within the unit 10 in addition to connecting the telephone to line 56. For example, the connector 34 may serve to interface a modem within the PDA portion of unit 10 to the cellular telephone 30, allowing facsimile messages, electronic mail messages, and other communications traffic to be sent over a cellular system.

Operation of the unit 10 may now be understood. The unit 10 may be carried by a user, placed on a desk, or mounted in a car or other vehicle. A cellular telephone 30 may or may not be mounted in the "cradle" of the unit 10. If one is not mounted, wireless communication can still be effected by the unit via the antenna 16. Provided the lid 18 containing the antenna is not rotated into a "fully opened position," described above, good communication performance can be expected.

Inclusion of a cellular telephone 30 with the cradle of the unit 10 can enhance performance when the unit is hand carded and operated with the lid 18 in the "fully opened position." This is because the cellular antenna 32, rather than the unit antenna 16, can be employed by the PDA unit 10, and further because the cellular antenna can easily be positioned to minimize coupling degradation.

The cellular telephone can also be fully inserted into the unit 10, without its antenna projecting (as in FIG. 1). In this situation, the cellular telephone could use the lid antenna 16, which could be more convenient for use, or more powerful, than the antenna 32.

A noteworthy aspect of the present invention is the fact that the advantages obtained are obtained at small cost. All that is required is a low cost mechanical switch in the telephone 30. This switch can be readily triggered by rotation of the antenna. A semiconductor switch could be employed instead of a mechanical switch, but at undoubtedly greater cost.

Based upon the foregoing, those skilled in the art should now fully understand and appreciate that the present invention provides a well unified antenna switching system for a combined electronic device and telephone. The switching system uses simple, low cost components. The switching system also very effectively ensures that coupling effects are minimized in typical device use. Furthermore, the present invention offers advantages in the art of cellular telephones even when those telephones are not placed in a cradle of a unit as taught herein. The fact that a low cost mechanical switch can effect routing of RF signals to either an antenna (e.g., antenna 32) or an external connector (e.g., connector 34) avoids the need for an expensive semiconductor switch, such as those presently used in cellular telephones.

Obviously, numerous modifications and variations are possible in view of the teachings above. Accordingly, within the scope of the appended claims, the present invention may be practiced otherwise than as specifically described hereinabove.

What is claimed is:

1. A radio unit comprising:
   a radio frequency portion;
   a first antenna, said first antenna rotatably connected to said radio unit;
   a port that can be operatively connected to a second, external antenna; and
   a switch disposed in circuit between said radio frequency portion and said first antenna and, further, between said radio frequency portion and said port, said switch connecting said radio frequency portion to either said first antenna or said port depending upon the rotational position of said first antenna.

2. A communications system comprising:
   a host component having a first antenna; and
   a radio unit that may be connected to said host component, said radio unit comprising
   a second, rotatable antenna, and
   a switch that is triggered by rotation of said second, rotatable antenna to activate said first antenna or said second, rotatable antenna.

3. The communications system as recited in claim 2, wherein said radio unit is a cellular telephone.

4. The communications system as recited in claim 2, wherein said switch is a mechanical switch.

5. The communications system as recited in claim 2, wherein said host component comprises portions forming a cradle, and wherein said radio unit may be connected to said host component by being placed in said cradle.

6. The communications system as recited in claim 5, wherein said host component further comprises a personal digital assistant.

7. A communications system comprising:
   a host component having a first antenna;
   a radio unit that may be connected to said host component, said radio unit having a second, rotatable antenna; and a mechanical switch that activates said first antenna when said radio unit is connected to said host component and when said second rotatable antenna is disposed in a first position, and which mechanical switch activates said second antenna when said radio unit is connected to said host component and when said second, rotatable antenna is disposed in a second position.

8. The communications system as recited in claim 7, wherein said host component comprises a lid, and wherein said first antenna comprises a flat antenna unit disposed within said lid.

9. The communications system as recited in claim 7, wherein said host component comprises a personal digital assistant.

10. The communications system as recited in claim 9, wherein said radio unit comprises a cellular telephone.

* * * * *